US008806129B2

(12) United States Patent
Duvalsaint et al.

(10) Patent No.: US 8,806,129 B2
(45) Date of Patent: Aug. 12, 2014

(54) MOUNTED CACHE MEMORY IN A MULTI-CORE PROCESSOR (MCP)

(75) Inventors: Karl J. Duvalsaint, Lagrangeville, NY (US); Daeik Kim, White Plains, NY (US); Moon J. Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 12/275,508

(22) Filed: Nov. 21, 2008

(65) Prior Publication Data

US 2010/0131713 A1 May 27, 2010

(51) Int. Cl.
*G06F 12/08* (2006.01)

(52) U.S. Cl.
USPC ........... 711/118; 711/130; 711/117; 711/148; 709/213

(58) Field of Classification Search
CPC .............. G06F 12/084; G06F 12/0842; G06F 12/0846; G06F 12/0871; G06F 2212/601
USPC ................... 711/130, 117, 118, 148; 709/213
See application file for complete search history.

(56) References Cited

U.S. PATENT DOCUMENTS

| | | | |
|---|---|---|---|
| 5,721,883 A | 2/1998 | Katsuo et al. | |
| 5,821,769 A | 10/1998 | Douseki | |
| 5,838,047 A | 11/1998 | Yamauchi et al. | |
| 6,215,898 B1 | 4/2001 | Woodfill et al. | |
| 6,289,438 B1* | 9/2001 | Takayanagi | 712/218 |
| 6,404,239 B1 | 6/2002 | Kawahara et al. | |
| 6,404,902 B1 | 6/2002 | Takano et al. | |
| 6,456,737 B1 | 9/2002 | Woodfill et al. | |
| 6,535,433 B2 | 3/2003 | Ooishi | |
| 6,567,622 B2 | 5/2003 | Phillips | |
| 6,651,145 B1 | 11/2003 | Jamil et al. | |
| 6,661,931 B1 | 12/2003 | Kawada | |
| 6,744,931 B2 | 6/2004 | Komiya et al. | |

(Continued)

FOREIGN PATENT DOCUMENTS

| | | |
|---|---|---|
| CN | 1427340 A | 7/2003 |
| CN | 1474969 A | 2/2004 |

(Continued)

OTHER PUBLICATIONS

Levacq, D. et al., Backgate Bias Accelerator for 10ns-order Sleep-to-Active Modes Transition time, IEEE Asian Solid-State Circuits Conference, Nov. 2007, pp. 296-299.

(Continued)

*Primary Examiner* — Matthew Bradley
*Assistant Examiner* — Ramon A Mercado
(74) *Attorney, Agent, or Firm* — William E. Schiesser; Keohane & D'Alessandro, PLLC

(57) ABSTRACT

Specifically, under the present invention an available on-chip memory is coupled to another logic core or memory (e.g., cache) unit using a set of cache managers. Specifically, each cache manager is coupled to the input and output of a cache memory unit. This allows the assigned memory to become an extension of the same level cache, next level cache memory, or memory buffer. This also allows the recovery of a memory block whose logic core is not operational, and is used to improve cache memory performance of the system. It should be understood in advance the teachings herein are typically applied to a Multi-Core Processor (MCP), although this need not be the case.

18 Claims, 3 Drawing Sheets

(56) References Cited

U.S. PATENT DOCUMENTS

| | | | |
|---|---|---|---|
| 6,829,378 | B2 | 12/2004 | DiFilippo et al. |
| 6,922,783 | B2 | 7/2005 | Knee et al. |
| 7,028,196 | B2 | 4/2006 | Soltis, Jr. et al. |
| 7,039,818 | B2 | 5/2006 | Deng et al. |
| 7,080,267 | B2 | 7/2006 | Gary et al. |
| 7,095,882 | B2 | 8/2006 | Akahori |
| 7,102,777 | B2 | 9/2006 | Haraguchi |
| 7,168,070 | B2 | 1/2007 | Archambault et al. |
| 7,418,368 | B2 | 8/2008 | Kim et al. |
| 7,521,762 | B2 | 4/2009 | Hidaka |
| 7,531,994 | B2 | 5/2009 | Itoh |
| 2003/0080782 | A1 | 5/2003 | Bailey et al. |
| 2003/0114205 | A1 | 6/2003 | Yamashita |
| 2004/0059875 | A1* | 3/2004 | Garg et al. ............ 711/141 |
| 2005/0034002 | A1 | 2/2005 | Flautner |
| 2005/0083338 | A1 | 4/2005 | Yun et al. |
| 2005/0144223 | A1 | 6/2005 | Yang et al. |
| 2005/0263678 | A1 | 12/2005 | Arakawa |
| 2005/0268039 | A1 | 12/2005 | Archambault et al. |
| 2005/0289365 | A1 | 12/2005 | Bhandarkar |
| 2006/0013473 | A1 | 1/2006 | Woodfill et al. |
| 2006/0015772 | A1* | 1/2006 | Ang et al. ............ 714/7 |
| 2006/0022742 | A1 | 2/2006 | Parris et al. |
| 2006/0250514 | A1 | 11/2006 | Inoue et al. |
| 2006/0268357 | A1 | 11/2006 | Vook et al. |
| 2007/0159642 | A1 | 7/2007 | Choi |
| 2008/0015772 | A1 | 1/2008 | Sanma et al. |
| 2008/0084775 | A1 | 4/2008 | Hoberman et al. |
| 2008/0122479 | A1 | 5/2008 | Hidaka |

FOREIGN PATENT DOCUMENTS

| | | |
|---|---|---|
| CN | 1871587 A | 11/2006 |
| EP | 1 662 389 A2 | 5/2006 |
| EP | 1863177 A2 | 12/2007 |
| WO | 95/25306 A2 | 9/1995 |

OTHER PUBLICATIONS

Kim, K. et al., "Back-Gate Controlled Wide Tunable Range Diode Voltage in Asymmetrical Double-Gate Devices", IEEE International SOI Conference Proceedings, Oct. 2006, pp. 151-152.

Makino, H. et al., "An Auto-Backgate-Controlled MT-CMOS Circuit", 1998 Symposium on VLSI Circuits Digest of Technical Papers, Jun. 1998, pp. 42-43.

Notice of Allowance dated May 21, 2010 for U.S. Appl. No. 12/275,521, filed Nov. 21, 2008.

Prosecution History for U.S. Appl. No. 12/275,552.

Prosecution History for U.S. Appl. No. 12/276,069.

Prosecution History for U.S. Appl. No. 12/276,072.

Prosecution History for U.S. Appl. No. 12/275,521.

Information Materials for IDS dated Jun. 22, 2011.

Information Materials for IDS.

Bibliographic Data for CN1474969(A) with English Abstract.

Bibliographic Data for CN1871587(A) with English Abstract.

Bibliographic Data for CN1427340(A) with English Abstract.

* cited by examiner

MOUNTED CACHE MEMORY IN A MULTI-CORE PROCESSOR (MCP)

CROSS-REFERENCE TO RELATED APPLICATIONS

This application is related in some aspects to commonly owned and co-pending, 12/275,521 entitled "Charge Transfer for Digital Circuits," filed Nov. 21, 2008, the entire contents of which are herein incorporated by reference. This application is also related in some aspects to commonly owned and co-pending, 12/275,552 entitled "Cache Memory Sharing in a Multi-Core Processor (MCP)," filed Nov. 21, 2008, the entire contents of which are herein incorporated by reference. This application is also related in some aspects to commonly owned and co-pending, 12/276,069 entitled "Pseudo Cache Memory in a Multi-Core Processor (MCP)," filed Nov. 21, 2008, the entire contents of which are herein incorporated by reference. This application is also related in some aspects to commonly owned and co-pending, 12/276,072 entitled "Cache Memory Bypass in a Multi-Core Processor (MCP)," filed Nov. 21, 2008, the entire contents of which are herein incorporated by reference.

FIELD OF THE INVENTION

The preset invention generally relates to multi-core processors (MCP). Specifically, the present invention relates to mounted cache memory virtualization in a MCP.

BACKGROUND OF THE INVENTION

Multi-Core Processor (MCP) with hierarchical architecture is a trend for state-of-the-art digital system. Typically, MCPs are implemented with aggressively scaled nanometer CMOS technologies to have high device density and multi-core design. On the other hand, yield failure is caused by the process variability and defects in nanometer CMOS manufacturing. With the hierarchical architecture, a partial failure causes extensive damage to the components in the tree hierarchy and architecture. Therefore, system design and operation methods to salvage operational component blocks are essential to improve product yield as well as to increase the reliability.

SUMMARY OF THE INVENTION

This disclosure describes an apparatus, computer architecture, memory structure, memory control, and cache memory operation method for multi-core processor. Specifically, under the present invention an available on-chip memory is coupled to another logic core or memory (e.g., cache) unit using a set of cache managers. Specifically, each cache manager is coupled to the input and output of a cache memory unit. This allows the assigned memory to become an extension of the same level cache, next level cache memory, or memory buffer. This also allows the recovery a memory block whose logic core is not operational, and is used to improve cache memory performance of the system.

A first aspect of the present invention provides a mounted memory system, comprising: a first memory unit mounted on a bus; a first cache manager coupled to an input and an output of the first memory unit; a second memory unit mounted on the bus; and a second cache manager coupled to an input and an output of the second memory unit, the first memory unit and the second memory unit being adapted to receive and send communications via the first cache manager and the second cache manager.

A second aspect of the present invention provides a mounted cache system, comprising: a first cache memory unit mounted on a bus; a first cache manager coupled to an input and an output of the first cache memory unit; a first set of sub-cache memory units coupled to the first cache manager; and a second cache memory unit mounted on the bus; a second cache manager coupled to an input and an output of the second cache memory unit; a second set of sub-cache memory units coupled to the second cache manager, the first cache memory unit and the second cache memory unit being adapted to receive and send communications via the first cache manager and the second cache manager.

A third aspect of the present invention provides a mounted cache memory method, comprising: issuing a first request to a first cache memory unit coupled to a bus, the first request being received by the first cache memory unit via a first cache manager coupled to an input and an output of the first cache memory unit; and issuing a second request from the first cache memory unit to a second cache memory unit coupled to the bus, the second request being received by the second cache memory unit via a second cache manager coupled to an input and an output of the second cache memory unit.

BRIEF DESCRIPTION OF THE DRAWINGS

These and other features of this invention will be more readily understood from the following detailed description of the various aspects of the invention taken in conjunction with the accompanying drawings in which.

Figure 1:
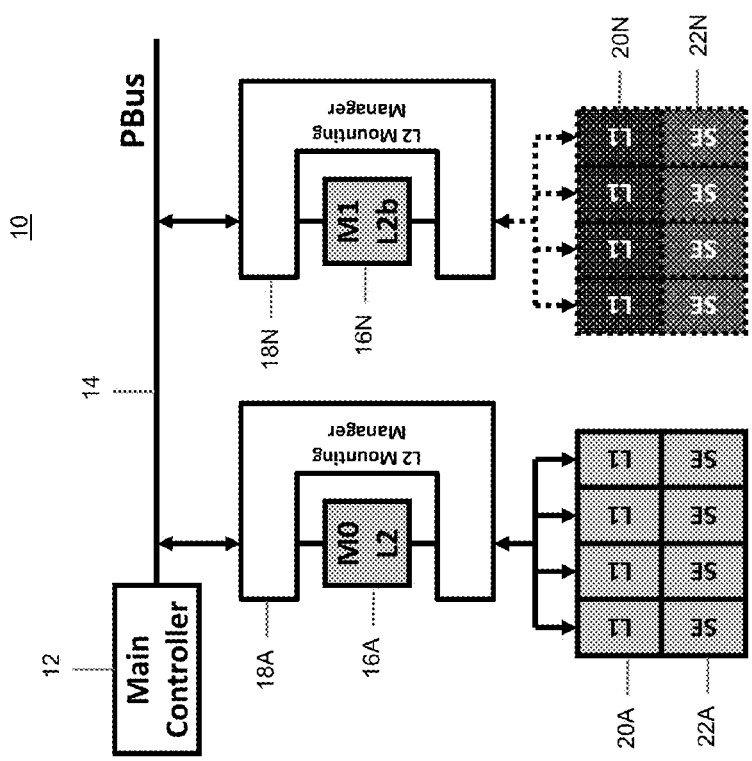
FIG. 1 depicts a mounted cache memory system, according to the present invention.

It should be understood that the drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description
II. Illustrative Example

I. General Description

As indicated above, this disclosure describes an apparatus, computer architecture, memory structure, memory control, and cache memory operation method for multi-core processor. Specifically, under the present invention an available on-chip memory is coupled to another logic core or memory (e.g., cache) unit using a set of cache managers. Specifically, each cache manager is coupled to the input and output of a cache memory unit. This allows the assigned memory to become an extension of the same level cache, next level cache memory, or memory buffer. This also allows the recovery of a memory block whose logic core is not operational, and is used to improve cache memory performance of the system. It should be understood in advance the teachings herein are typically applied to a Multi-Core Processor (MCP), although this need not be the case. In addition, it should be understood although this disclosure discusses memory units as being (virtual) cache or sub-cache memory units, this is only one example of the way in which in the teachings recited herein could be implemented. As such, it should be understood that these teachings could be implemented in conjunction with any type of memory now known or later developed.

Multi-Core Processor (MCP) with a hierarchical architecture is a trend for state-of-the-art digital system. Such implementations are typically implemented with aggressively scaled nanometer CMOS technologies to have high device density and multi-core design. On the other hand, yield failure is caused by the process variability and defects in nanometer CMOS manufacturing. With the hierarchical architecture, a partial failure causes extensive damage to the components in the tree hierarchy and architecture. The present invention improves the yield and the reliability of the MCP. This design includes architecture, memory structure, memory control, and cache memory operation method.

State-of-the-art digital systems employ a multi-core processor architecture. They are arranged hierarchically for efficient operation and computation management and design scalability. Since they assume that all the components in the hierarchy are sound, one slight failure would cause catastrophic failure of the remaining components in the tree architecture. The present invention addresses the case where a memory block is intact, but the logic components are damaged in the course of manufacturing, aging, and other reasons. In conventional designs, all the components in the hierarchy and tree are abandoned, which it results in very expensive losses in MCP products. The invention proposes to reuse the operational memory block, by mounting the memory to other functional blocks, such as digital logic core or other memory block. Moreover, the reuse of mounted cache memory units improves chip performance and resilience to manufacturing defects. The method can be applied to many different levels of on-chip cache memory.

Referring now to FIG. 1, a mounted cache memory system 10 according to the present invention is shown. As depicted, system 10 includes a main controller 12, a bus 14, a set (at least one) of cache memory units 16A-N coupled to bus 14, a set (at least one) of sub-cache memory units 20A-N coupled to set of cache memory units 16A-N, and a set (at least one) of sub-processing elements 22A-N coupled to sub-cache memory units 20A-N. Also shown in FIG. 1 is a set of cache managers 18A-N. As depicted, each cache manager 18A-N is coupled to an input 24A-N and an output 26A-N of a cache memory unit 16A-N.

Cache managers 18A-N foster communication among the components of FIG. 1. One type of such communication is memory requests. This can be especially useful when one memory unit "misses" or fails to satisfy the request, another memory unit (vertically within the hierarchy or adjacent) can be so requested. The cache memory mounting operation is done by finding dead logic and live memory in the MCP. Any live memory block with dead logic core can be dedicated to another memory or logic core, as a cache or a memory buffer. It does not have to be one-to-one relationship. A main controller at the top hierarchy manages mounting process, by performing diagnosis on memories and cores. Cache managers 18A-N receive (1) normal cache, (2) mounting or (3) being mounted instructions from the main controller. Main controller 12 communicates with cache managers 18A-N through bus 14. Cache managers 18A-N remember their status, and performs following cache operation steps.

II. Illustrative Example

Figure 2:
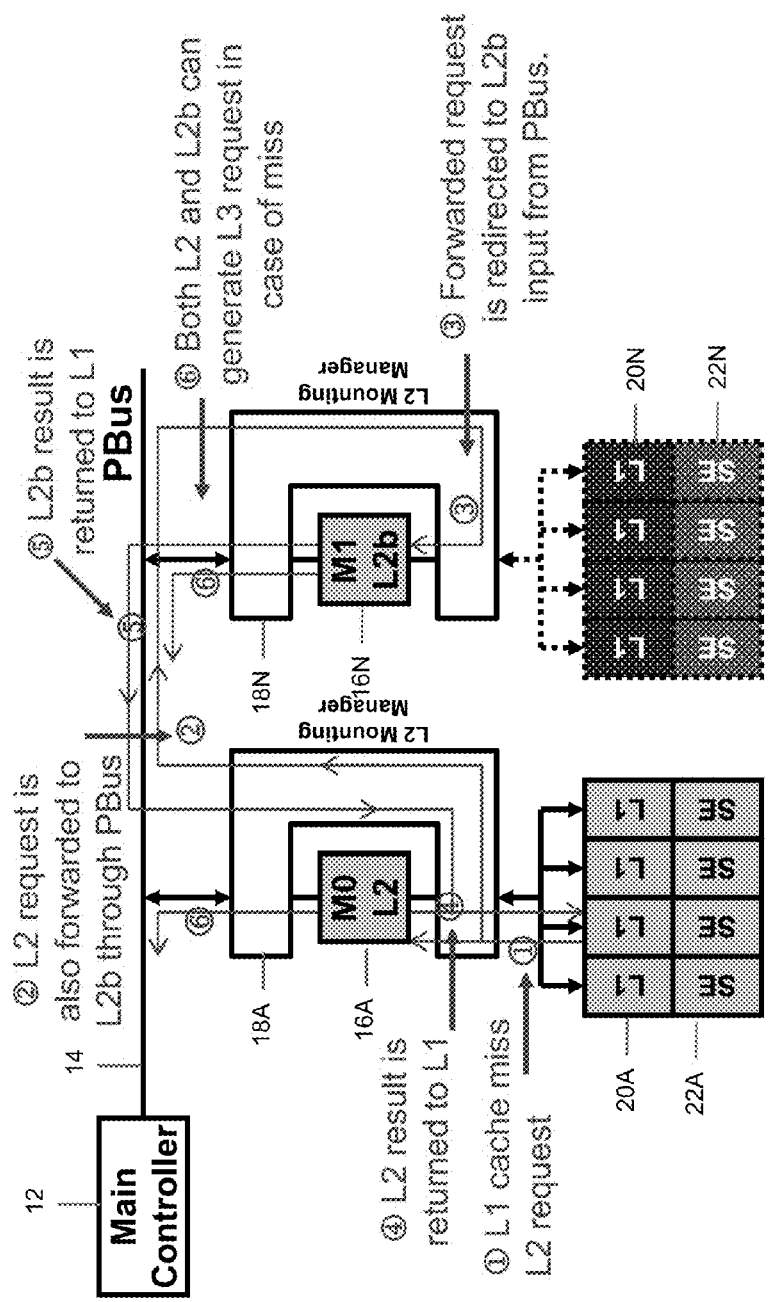
FIG. 2 depicts a progression of events involved with processing requests using the mounted cache memory system of FIG. 1, according to one example of the present invention.
Figure 3:
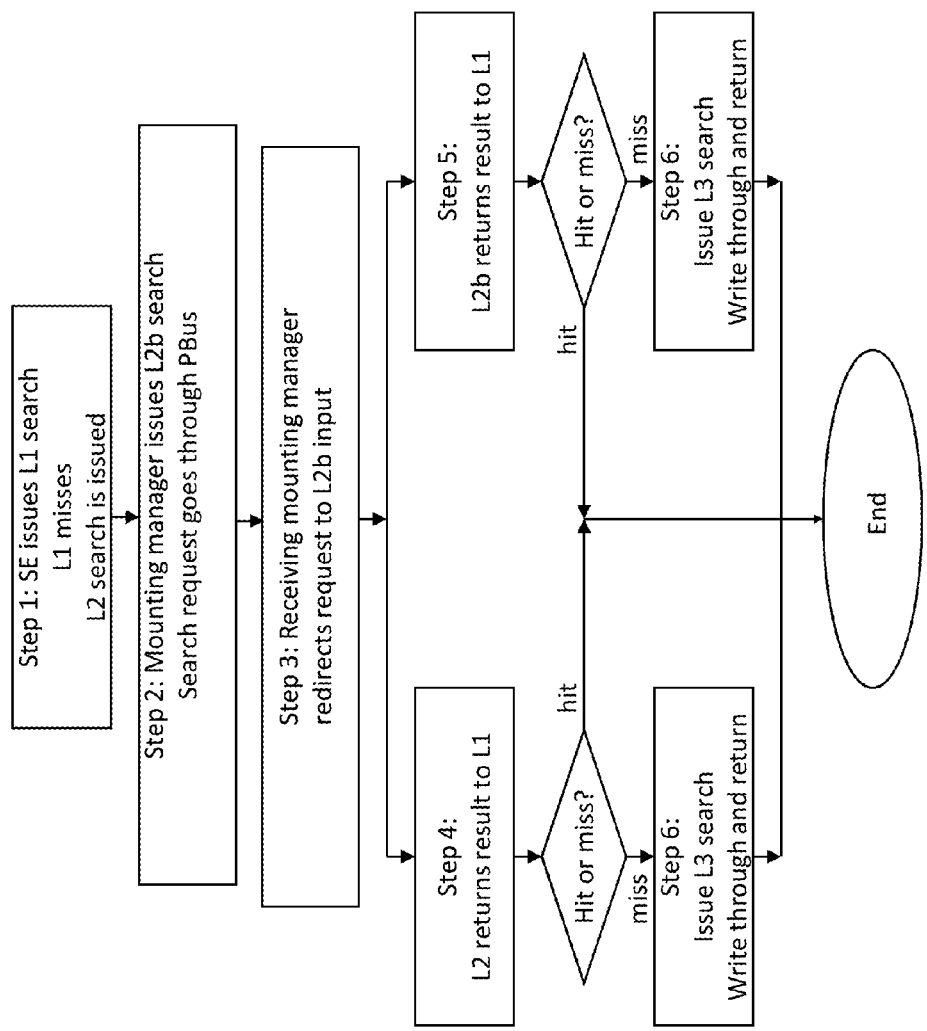
FIG. 3 depicts a method flow diagram pertaining to the example of FIG. 2, according to one example of the present invention.

FIGS. 2 and 3 (FIG. 3 utilizes the symbols shown in FIG. 2 as opposed to reference numerals) show a progression of events for such an example. Under this example, the right side group is assumed as non-operational, due to failures in processing elements. As shown, sub processing element 22A sends a request to sub-cache memory unit 20A for memory content, which sub-cache memory unit 20A cannot fulfill (cache miss). In response, sub-cache memory unit 20A sends a request to cache memory unit 16A. The request is initially received by cache manager 18A and fed to input 26A of cache memory unit 16A. In addition, cache manager 18N forwards a duplicate request to of cache memory unit 16N. Similarly, this request is initially received by cache manager 18N, which redirects the request to the input 24A of cache memory unit. Due to its proximity, cache memory unit 16A responds to sub-cache memory unit 20A (via cache manager 16A) first, either cache hit or miss. If it is a hit, no further operation is needed and the following responses and operations can be ignored: Cache memory unit 16N responds to sub-cache memory unit 20A with either a cache hit or miss. If it is a hit, no further operation is needed and the following responses and operations can be ignored. If both cache memory units 16A-B miss the memory address, both can generate a new cache memory unit (usually external memory on board).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A mounted memory system, comprising:
   a first memory unit mounted on a bus;
   a first cache manager coupled to an input and an output of the first memory unit;
   a second memory unit mounted on the bus;
   a second cache manager coupled to an input and an output of the second memory unit, the first memory unit and the second memory unit being adapted to receive and send communications via the first cache manager and the second cache manager;
   a second set of sub-memory units and a second set of sub-processing elements coupled to the second cache manager, the second set of sub-memory units and the second set of sub-processing elements located on a lower hierarchical level than the second memory unit; and
   wherein the second cache manager is configured to receive a request for memory content from the first cache manager and direct the request for memory content to the input of the second memory unit to enable the second memory unit to function as a next-level higher cache to the first memory unit, including in the case that either of the following are non-operational: the second set of sub-memory units, and the second set of sub-processing elements.

2. The mounted memory system of claim 1, the first memory unit and the second memory unit comprising virtualized cache memory units.

3. The mounted memory system of claim 1, further comprising:
- a first set of sub-memory units coupled to the first cache manager; and
- a first set of sub-processing elements coupled to the first set of sub-memory units.

4. The mounted memory system of claim 3, the first memory unit being adapted to receive a request from any of the first set of sub-memory units via the first cache manager.

5. The mounted memory system of claim 4, the first memory unit being further adapted to forward the request to the second memory unit via the first cache manager and the second cache manager.

6. The mounted memory system of claim 1, the second memory unit being adapted to receive a request from any of the second set of sub-memory units via the second cache manager.

7. The mounted memory system of claim 6, the second memory unit being further adapted to forward the request to the first memory unit via the second cache manager and the first cache manager.

8. The mounted memory system of claim 1, the bus being coupled to a main controller.

9. A mounted cache system, comprising:
- a first cache memory unit mounted on a bus;
- a first cache manager coupled to an input and an output of the first cache memory unit;
- a first set of sub-cache memory units and a first set of sub-processing elements coupled to the first cache manager, the first set of sub-cache memory units and the first set of sub-processing elements located on a lower hierarchical level than the first cache memory unit;
- a second cache memory unit mounted on the bus;
- a second cache manager coupled to an input and an output of the second cache memory unit; and
- a second set of sub-cache memory units coupled to the second cache manager and located on a lower hierarchical level than the second cache memory unit, the first cache memory unit and the second cache memory unit being adapted to receive and send communications via the first cache manager and the second cache manager, and wherein the second cache manager is configured to receive a request for memory content originating from the first set of sub-processing elements coupled to the first set of sub-cache memory units via the first cache manager and direct the request for memory content to the input of the second memory unit to enable the second memory unit to function as a next-level higher cache to the first memory unit, including in the case that the second set of sub-cache memory units is non-operational.

10. The mounted cache system of claim 9, the first cache memory unit being adapted to receive a request from any of the first set of sub-cache memory units via the first cache manager.

11. The mounted cache system of claim 10, the first cache memory unit being further adapted to forward the request to the second cache memory unit via the first cache manager and the second cache manager.

12. The mounted cache system of claim 9, further comprising a second set of sub-processing elements coupled to the second set of sub-cache memory units.

13. The mounted cache system of claim 12, the second cache memory unit being adapted to receive a request from any of the second set of sub-cache memory units via the second cache manager.

14. The mounted cache system of claim 13, the second cache memory unit being further adapted to forward the request to the first cache memory unit via the second cache manager and the first cache manager.

15. The mounted cache system of claim 9, the bus being coupled to a main controller.

16. A mounted cache memory method, comprising:
- issuing a first request for memory content originating from a first set of sub-processing elements coupled to a first cache memory unit that is coupled to a bus, the first request for memory content being received by the first cache memory unit via a first cache manager coupled to an input and an output of the first cache memory unit, and the first set of sub-processing elements being located on a lower hierarchical level than the first cache memory unit; and
- issuing, including in the case that a second set of sub-cache memory units of coupled to a second cache memory unit is non-operational, a second request for the memory content from the first cache memory unit to the second cache memory unit that is coupled to the bus, the second request being received at an input of the second cache memory unit via a second cache manager coupled to the input and an output of the second cache memory unit to enable the second memory unit to function as a next-level higher cache to the first memory unit, and wherein the second set of sub-cache memory units is located on a lower hierarchical level than the second memory unit.

17. The mounted cache memory method of claim 16, the first request being received from a first set of sub-cache memory units coupled to the first cache memory unit.

18. The mounted cache memory method of claim 16, the second request being issued pursuant to a failure by the first cache memory unit to fulfill the first search request, and wherein an additional request to at least one externally located cache memory unit is issued by each of the first cache memory unit and the second memory unit pursuant to a failure by the second cache memory unit to fulfill the second search request.

* * * * *